[54] BAFFLE ASSEMBLY FOR FUEL TANK

[75] Inventors: Masaya Kotera, Zama; Tamiya Kigawa, Fuji, both of Japan

[73] Assignees: Nissan Motor Company, Ltd.; Yamakawa Industrial Co., Ltd., both of Japan

[21] Appl. No.: 559,914

[22] Filed: Jul. 30, 1990

[30] Foreign Application Priority Data

Aug. 17, 1989 [JP] Japan ........ 1-211863

[51] Int. Cl.$^5$ ........ B65D 25/00

[52] U.S. Cl. ........ 220/563; 220/501

[58] Field of Search ........ 220/563, 855, 88.1, 220/501; 244/135 R; 137/574

[56] References Cited

U.S. PATENT DOCUMENTS

| | | | |
|---|---|---|---|
| 2,305,923 | 12/1942 | Held | 220/563 X |
| 2,379,126 | 6/1945 | Welden | 220/563 |
| 3,294,278 | 12/1966 | Madden et al. | 220/93 |
| 3,650,431 | 3/1972 | Stewart | 220/88 R |
| 4,168,718 | 9/1979 | Frosch et al. | 137/574 X |
| 4,294,279 | 10/1981 | Wyeth | 220/855 X |
| 4,764,408 | 8/1988 | Stedman et al. | 428/71 |
| 4,809,745 | 3/1989 | Hörmann | 137/574 |
| 4,844,278 | 7/1989 | Freiwald et al. | 220/563 |
| 4,858,778 | 8/1989 | Patrick | 220/563 X |

FOREIGN PATENT DOCUMENTS

| | | |
|---|---|---|
| 62-108126 | 7/1987 | Japan . |
| 1129894 | 10/1968 | United Kingdom . |

*Primary Examiner*—Steven M. Pollard

*Attorney, Agent, or Firm*—Lowe, Price, LeBlanc & Becker

[57] ABSTRACT

A baffle assembly for a fuel tank includes a baffle frame formed with an opening and a baffle member installed in the opening. The baffle member is formed from a mass of synthetic resin strings which are joined collectively into a sponge-like structure.

15 Claims, 5 Drawing Sheets

BAFFLE ASSEMBLY FOR FUEL TANK

BACKGROUND OF THE INVENTION

1. Field of the Invention

The present invention relates in general to fuel tanks and more particularly to a baffle assembly for a fuel tank for an automotive vehicle, etc.

2. Description of the Prior Art

Generally, a fuel tank is equipped with a baffle assembly for preventing a large quantity of fuel from flowing or moving at one time, whereby to reduce the noise caused by fuel movement and the possibility of malfunction of a float as much as possible. An example of such a baffle assembly is disclosed in Japanese Utility Model Provisional Publication No 62-108126 and also shown in FIG. 14.

Referring to FIG. 14, a baffle assembly 1 is made of metal and spot-welded to the inner surface of a fuel tank main body 2. The baffle assembly 1 consists of a horizontal wall member 3 and a vertical wall member 4 attached thereto. The horizontal wall member 3 is formed with a number of openings 5 to allow restricted flow of fuel therethrough.

A disadvantage of the prior art baffle assembly is that it is heavy since it is entirely made of metal.

Another disadvantage is that for the reason of weight the baffle assembly cannot have a sufficient number of and sufficiently large or spacious baffle wall members and therefore cannot reduce the noize caused by fuel movement to a desired extent.

SUMMARY OF THE INVENTION

In accordance with the present invention, there is provided a fuel tank which comprises a fuel tank main body and a baffle assembly installed in the fuel tank main body for restricting movement of fuel therein.

The baffle assembly includes a baffle frame secured to the fuel tank main body and having an opening, and a baffle member formed from a mass of tangled synthetic resin strings and installed in the opening.

The above structure is effective for overcoming the above noted disadvantages inherent in the prior art device.

It is accordingly an object of the present invention to provide a baffle assembly for a fuel tank which is light in weight and can efficiently reduce the noise otherwise caused by fuel movement in the fuel tank.

It is another object of the present invention to provide a baffle assembly of the above described character which can reduce the manufacturing and assembling expense.

It is a further object of the present invention to provide a baffle assembly of the above described character which is suited for mass production.

DESCRIPTION OF THE PREFERRED EMBODIMENTS

Figure 1:
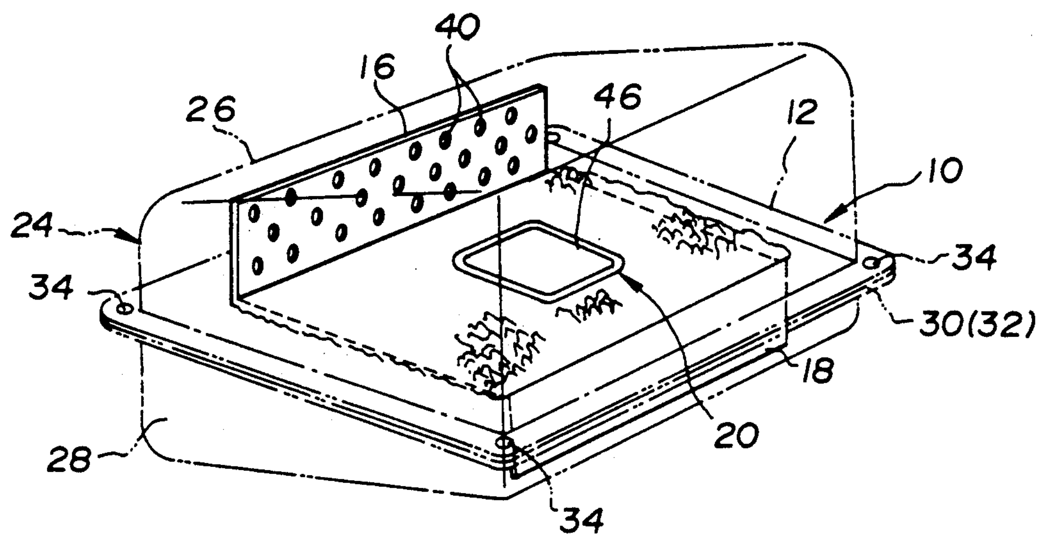
FIG. 1 is a perspective view of a baffle assembly for a fuel tank according to an embodiment of the present invention.

Referring first to FIGS. 1 to 7, a baffle assembly 10 according to an embodiment of the present invention includes a generally rectangular baffle frame 12 made of metal and having a rectangular central opening 14. The baffle frame 12 has, at its inner edges defining a pair of opposite sides of the central opening 14, a pair of integral upright walls 16 and 18 extending in the opposite directions, i.e., upwardly and downwardly. The baffle frame 12 has installed thereon a baffle member 20 in the form of a generally rectangular wall formed from a mass of tangled plastic strings or filaments 22. A fuel tank main body 24 is constituted by upper and lower shells 26 and 28 which are joined at flanges 30 and 32 thereof while interposing therebetween the baffle frame 12. The baffle frame 12 has at each corner portions, location holes 34 corresponding in position to respective location holes 36 and 38 formed in the flanges 30 and 32 of the upper and lower shells 26 and 28. The upright walls 16 and 18 are formed with a plurality of openings 40 for allowing restricted flow of fuel therethrough.

Figure 13:
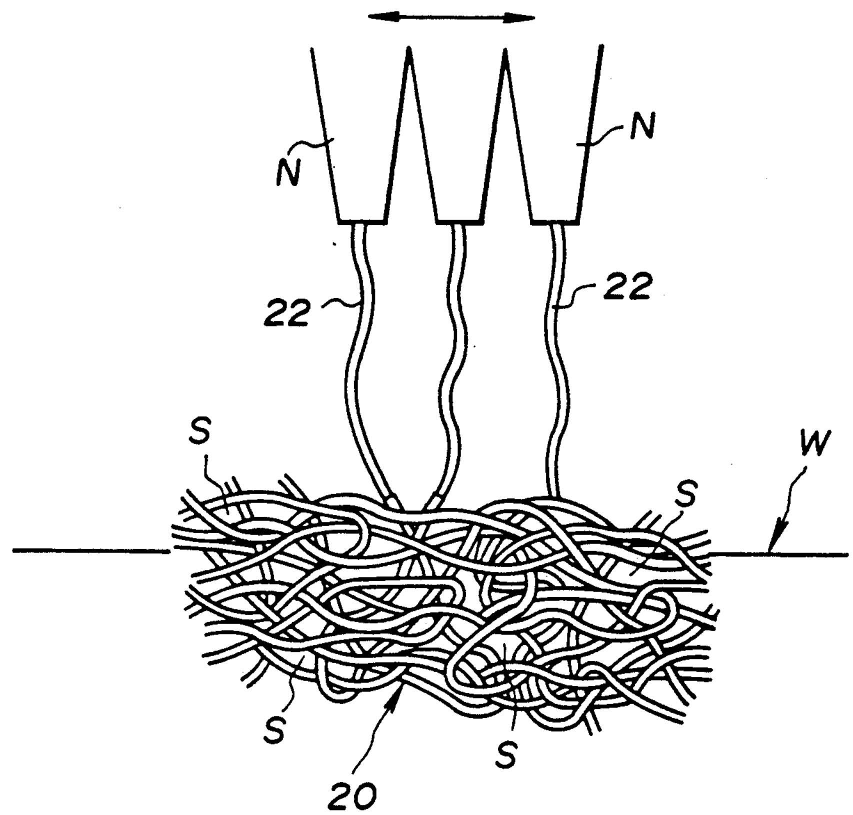
FIG. 13 is an enlarged view of a portion of a baffle assembly of this invention.
Figure 14:
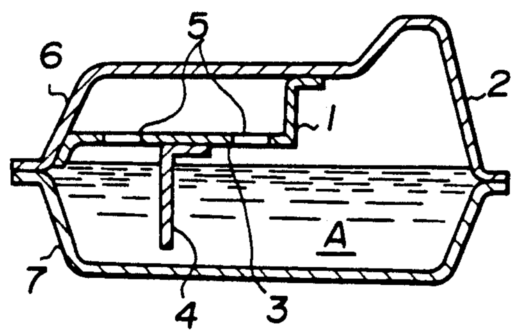
FIG. 14 is a sectional view of a fuel tank equipped with a prior art baffle assembly.

The baffle member 20, as shown in FIG. 13, is formed from pieces of strings, filaments or threadlike members 22, which are made of thermoplastic resin as polypropelene, polyethylene, or the like polyolefine resin and which are tangled and joined collectively to form a sponge-like porous structure. By this, the baffle member 14 is formed with a number of pores or small spaces "S" which are intercommunicated to define a number of passages extending both in the thickness direction and in the direction transversal thereto and arranged intricately in a mazelike or labylinthlike manner.

By this, the baffle member 14 can gradually absorb the energy of a mass of moving fuel as the fuel passes through the mazedly and intricately arranged spaces "S".

As shown in FIG. 13, the baffle member 14 is formed by using a plurality of nozzles "N" which are movable freely in the horizontal direction. That is, the nozzles "N" are horizontally moved in the various directions while discharging a predetermined amount of synthetic resin in a molten state and allowing it to go down into water "W".

The upright walls 16 and 18 of the baffle frame 12 are disposed adjacent to the front and rear walls of the rectangular fuel tank main body 24 opposing in the front to rear direction of the vehicle such that the energy of a mass of fuel moving toward the front and rear walls of the fuel tank main body 26 is absorbed by the upright walls 16 and 18 effectively. Further, the front upright wall 16 is formed as tall as possible so as to be effective even on a high wave of fuel.

Figure 2:
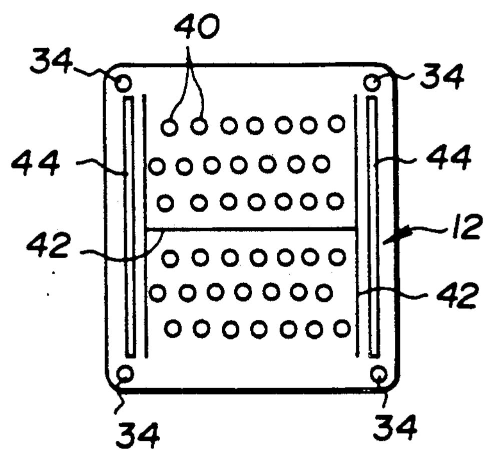
FIG. 2 is a top plan view of an intermediate product of a baffle frame employed in the baffle assembly of FIG. 1.
Figure 3:
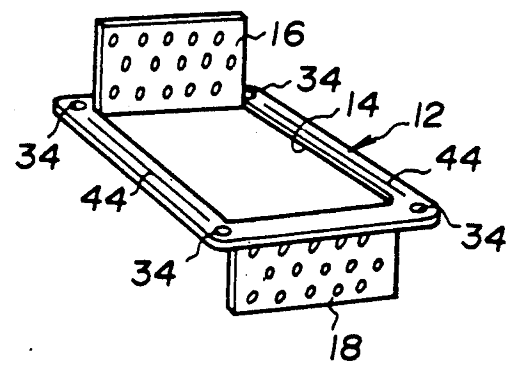
FIG. 3 is a perspective view of the finished or completed baffle frame for the baffle assembly of FIG. 1.
Figure 4:
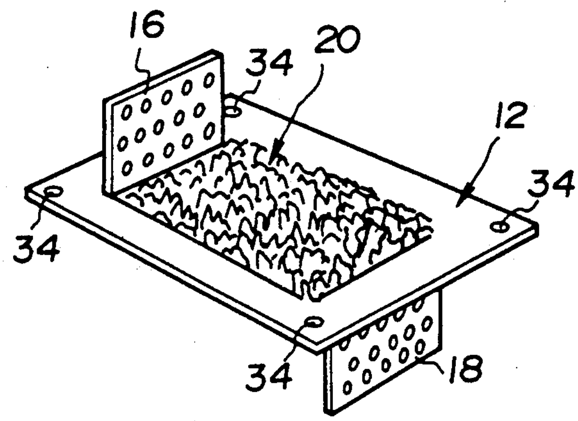
FIG. 4 is a perspective view of the baffle assembly of FIG. 1.
Figure 5:
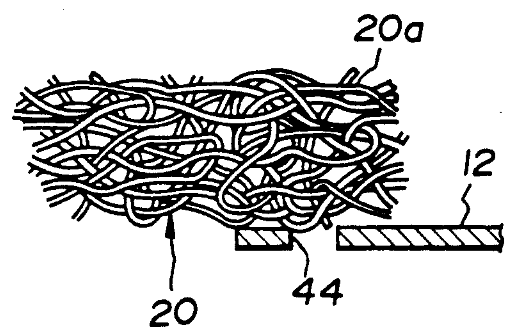
FIGS. 5 and 6 are sectional views illustrating the processes of attaching to a baffle frame a baffle member formed from a mass of tangled synthetic resin strings.
Figure 6:
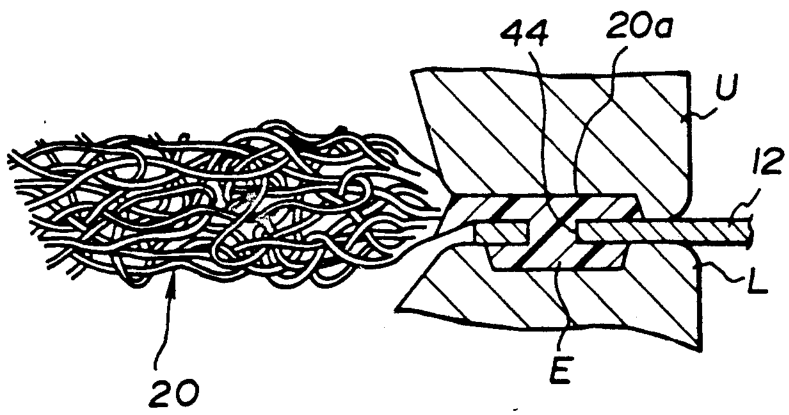

In production of the baffle assembly 10, a metal blank 12', as shown in FIG. 2, is first prepared which is formed with an H-like cut 42 and a pair of parallel slits 44 extendingly parallely along the parallely opposed portions of the cut 42 and disposed outside of same. Then, as shown in FIG. 3, the walls 16 and 18 are separated at the cut 42 and bent in the opposite directions to form the baffle frame 12. The baffle member 20 formed from a mass of thermo-plastics strings which are tangled and joined collectively is installed on the baffle frame 12 as shown in FIG. 4. In this instance, as shown in FIG. 5, the baffle member 20 is installed in such a manner that its end portions 20*a* lap over the slits 44 of the baffle frame 12. The baffle member 20 is then pressed in hot dies U and L which are heated up to a predetermined temperature, together with the baffle frame 8 such that the baffle member 20 is partly melted at the end portions 20*a* to fill the cavity "E" between the dies U and L and thus fixed at the end portions 20*a* to the baffle frame 12 when cooled and solified as shown in FIG. 6. The baffle member 20 is then formed with a pump gauge receiving hole 46, etc. (refer to FIG. 1) in predetermined places.

Figure 7:
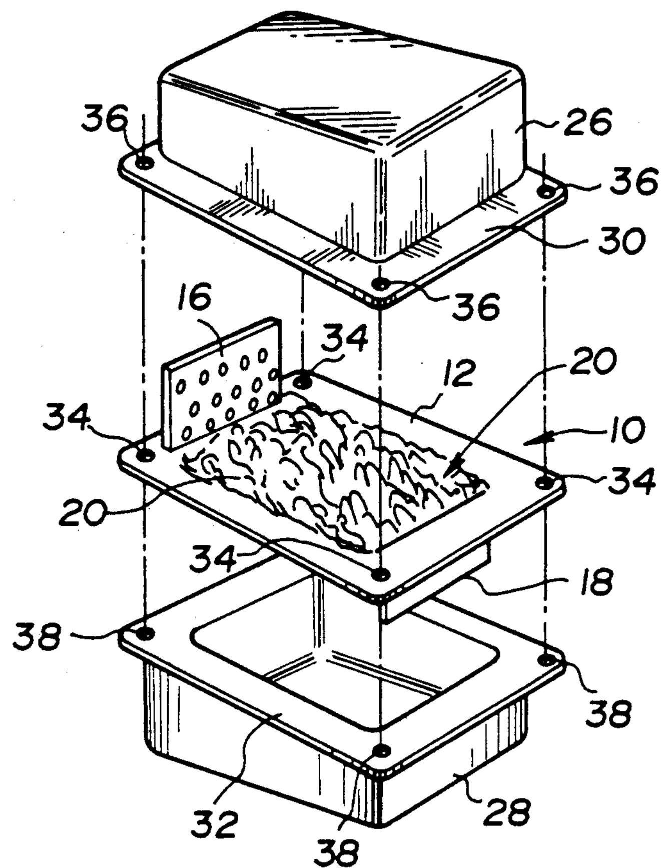
FIG. 7 is an exploded view of a fuel tank equipped with the baffle assembly of FIG. 1.

In installation of the baffle assembly 10 in the fuel tank main body 24, the baffle assembly 10 is placed between the flanges 30 and 32 of the upper and lower shells 26 and 28 as seen from FIG. 7. The location holes 36 and 38 of the flanges 30 and 32 of the upper and lower shells 26 and 28 are aligned with the respective location holes 34 of the baffle assembly 10, and under this condition the flanges 30 and 32 are seam-welded together. In this instance, it is to be noted that the baffle assembly 10 is secured to the flanges 30 and 32 upon seam-welding of same.

From the foregoing, it will be understood that the baffle assembly 10 is secured to the fuel tank main body 24 without requiring any particular work as spot-welding, etc. but by common seam-welding, thus making it possible to simplify the assemblage or installation work of the baffle assembly and therefore making it possible to reduce the assembling expense.

It will be further understood that the baffle assembly 10 can be located relative to the fuel tank main body 2 by aligning the location holes 34 with the corresponding location holes 36 and 38, thus making it possible to further simplify the assembling work.

It will be further understood that while the baffle assembly 10 includes the baffle frame 12 made of metal, the baffle member 20 is formed from a plastic sponge-like body, thus making it possible to reduce the weight considerably.

It will be further understood that the baffle member 20 can absorb the energy of moving fuel gradually and thereby efficiently reduce the noise caused by fuel movement in the fuel tank.

Figure 8:
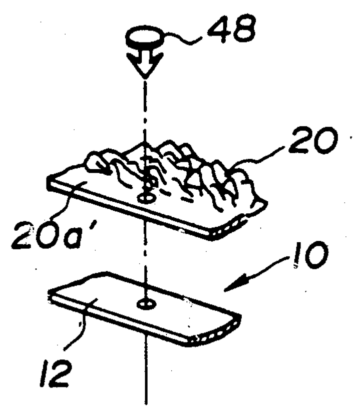
FIG. 8 is a fragmentary exploded view of a baffle assembly according to another embodiment of the present invention.
Figure 9:
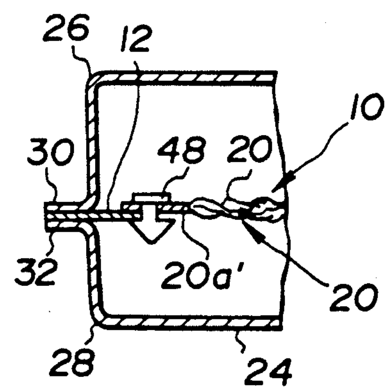
FIG. 9 is a fragmentary sectional view of a fuel tank equipped with the baffle assembly of FIG. 8.

FIGS. 8 and 9 show another embodiment which is substantially similar to the previous embodiment except that the baffle frame 12 and the baffle member 20 are joined in the different manner. That is, the baffle member 20 is formed with a solid, integral, peripheral flange 20*a'* by being solely pressed in hot dies prior to installation to the baffle frame 12. In installation, the baffle member 20 is secured at the peripheral flange 20*a'* to the baffle frame 12 by means of clips 48, etc. for thereby constituting the baffle assembly 10. In the meantime, the clips 48 may be formed integral with the baffle member 20 at the time of forming the peripheral flange 20*a'* by using hot dies. This embodiment can simplify the assemblage of the baffle frame 12 and the baffle member 20 and is therefore suited for mass production.

Figure 10:
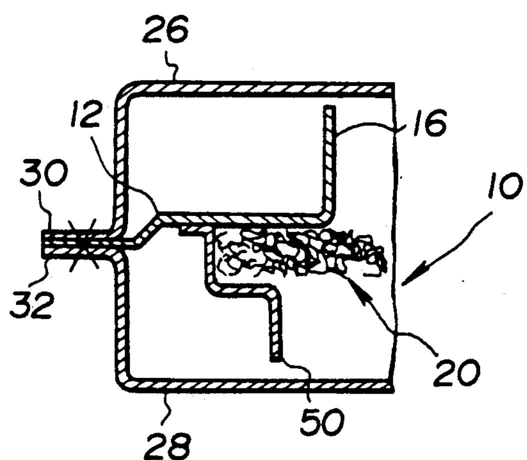
FIG. 10 is a fragmentary sectional view of a fuel tank equipped with a baffle assembly according to a further embodiment of the present invention.

FIG. 10 shows a further embodiment which is substantially similar to the previous embodiment of FIGS. 1 to 7 except that an additional upright flange 50 is attached to the baffle frame 12 by spot-welding for further restricting movement of fuel in a predetermined direction.

Figure 11:
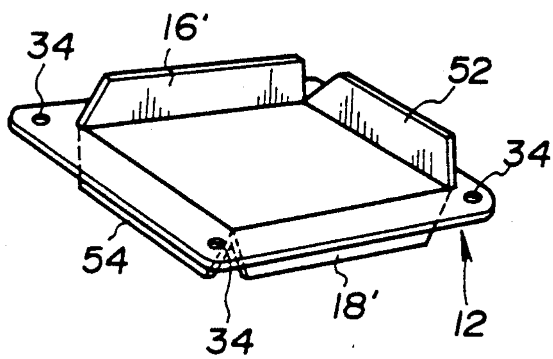
FIG. 11 is a perspective view of a frame for use in a baffle assembly according to a further embodiment of the present invention.

FIG. 11 shows a further embodiment which is substantially similar to the previous embodiment except that the baffle frame 12 is formed with two pair of integral upright walls 16', 18', 52 and 54 extending from the respective pair of inner edges in the opposite directions. The upright walls 16', 18', 52 and 54 are effective for restricting movement of fuel not only in the front to rear direction of the vehicle but in the vehicle width direction.

Figure 12:
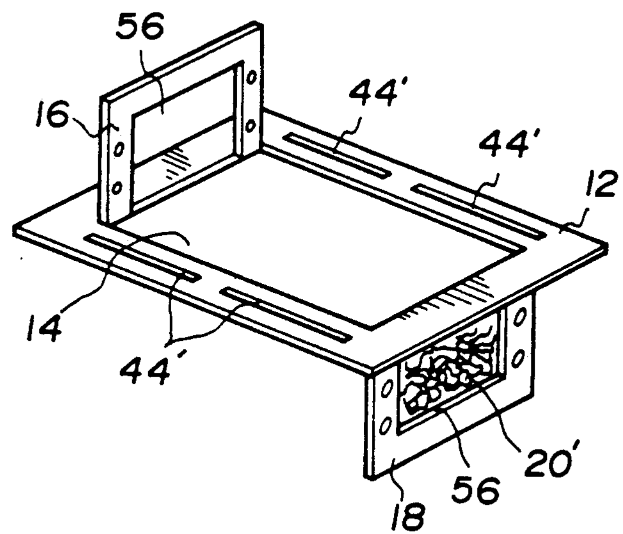
FIG. 12 is a perspective view of a baffle frame for use in a baffle assembly according to a further embodiment of the present invention.

FIG. 12 shows a further embodiment which is substantially similar to the previous embodiment except that the upright walls 16 and 18 of the baffle frame 12 are formed with openings 56 in which baffle members 20' similar to the baffle member 10 are installed and that each slit 44' consists of two separate sections. This embodiment is effective for further reducing the weight and the noise caused by fuel movement. The separation of the slit 17 is effective for increasing the rigidity.

What is claimed is:

1. A fuel tank comprising:

a fuel tank main body; and a baffle assembly installed in said fuel tank main body for restricting movement of fuel therein;

in which said baffle assembly includes a baffle frame secured to said fuel tank main body and having an opening and a baffle member formed from a mass of tangled synthetic resin strings and installed in said opening.

2. The fuel tank as claimed in claim 1 wherein said baffle frame is made of metal, and said synthetic resin is thermoplastic, said baffle member having a solid peripheral portion at which it is secured to said baffle frame.

3. The fuel tank as claimed in claim 2 wherein said solid peripheral portion of said baffle member is formed by being heated in hot dies together with said baffle frame.

4. The fuel tank as claimed in claim 3 wherein said baffle frame has a plurality of apertures around said opening through which said solid peripheral portion of said baffle member extends.

5. The fuel tank as claimed in claim 2 wherein said solid peripheral portion of said baffle member is formed by being heated in hot dies and secured to said baffle frame by means of clips.

6. The fuel tank as claimed in claim 5 wherein said clips are integral with said solid peripheral portion of said baffle member and formed at the same time when said solid peripheral portion is formed in said dies.

7. The fuel tank as claimed in claim 2 wherein said fuel tank main body is constituted by upper and lower shells having joining flanges, said baffle frame being interposed between said flanges.

8. The fuel tank as claimed in claim 7 wherein said opening of said baffle frame has a pair of opposite inner edges, said baffle frame having integral upright flanges extending from said inner edges in the opposite directions.

9. The fuel tank as claimed in claim 8 wherein said upright flanges of said baffle frame is opposed in a front to rear direction of an associated vehicle.

10. The fuel tank as claimed in claim 9 wherein said upright flanges are formed with a plurality of openings.

11. The fuel tank as claimed in claim 10 wherein each of said upright flanges is formed with an opening in which a baffle member formed from a mass of tangled synthetic resin strings is installed.

12. The fuel tank as claimed in claim 11 wherein said o first mentioned opening of said baffle frame further has another pair of inner edges opposed in the direction transversal to the direction in which said first pair of said inner edges are opposed, said baffle frame further has integral upright flanges extending from said second mentioned pair of said inner edges in the opposite directions.

13. The fuel tank as claimed in claim 8 wherein said baffle frame further has an upright flange secured thereto by welding.

14. The fuel tank as claimed in claim 7 wherein said joining flanges of said upper and lower shells have location holes, and said baffle frame has location holes aligned with corresponding location holes of said joining flanges.

15. The fuel tank as claimed in claim 14 wherein said joining flanges of said upper and lower sheels and said baffle member are joined together by a common welding process.

* * * * *